UNITED STATES PATENT OFFICE.

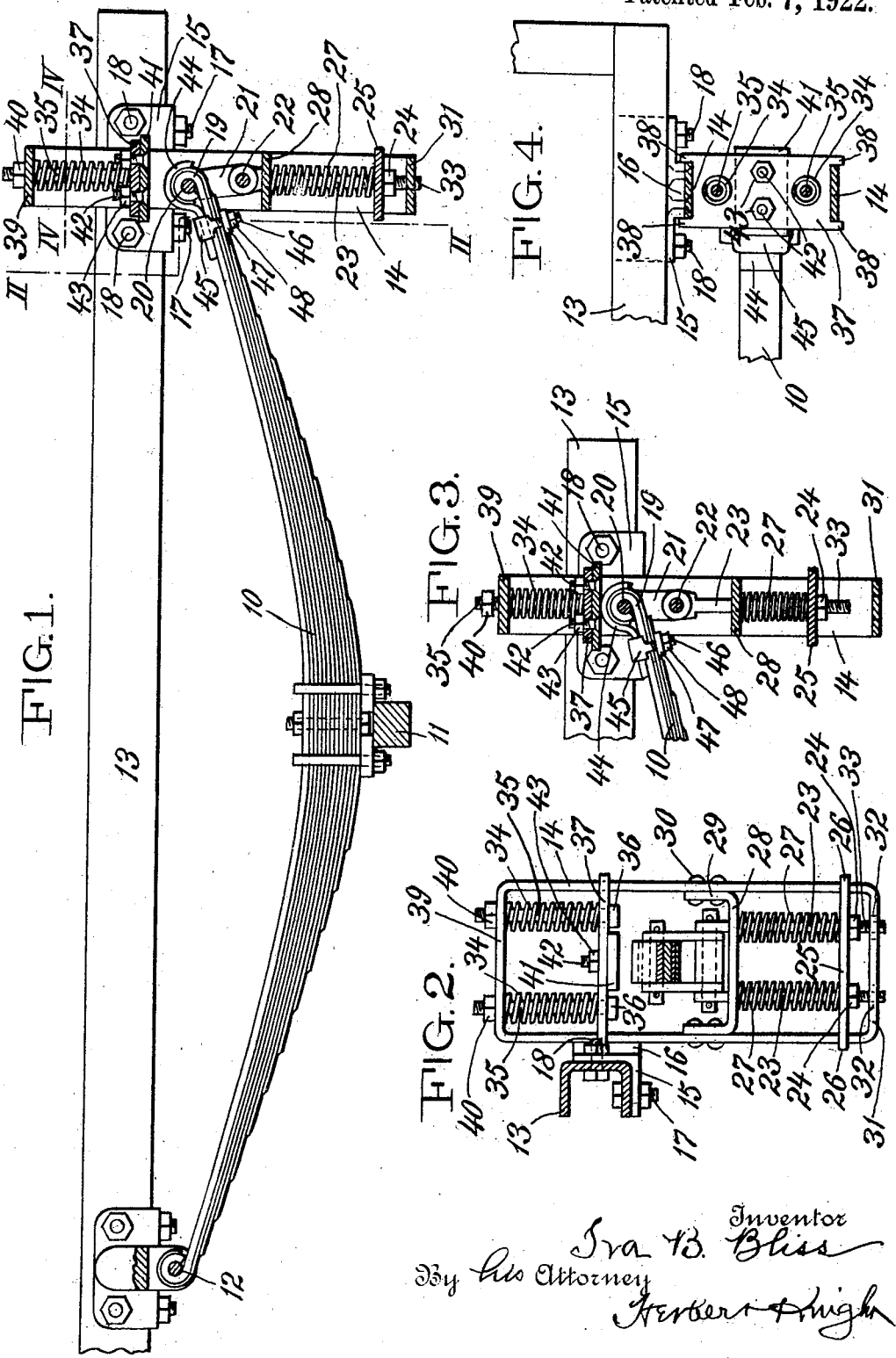

IRA B. BLISS, OF STAMFORD, CONNECTICUT.

CHASSIS AND SPRING PROTECTOR.

1,405,663.   Specification of Letters Patent.   Patented Feb. 7, 1922.

Application filed June 22, 1920. Serial No. 390,718.

*To all whom it may concern:*

Be it known that I, IRA B. BLISS, a citizen of the United States of America, and a resident of Stamford, county of Fairfield, and State of Connecticut, have invented a new and useful Chassis and Spring Protector, of which the following is a specification.

My invention as above indicated refers to means for protecting the spring and chassis of an automobile from shock and to this extent and in this manner it may also be referred to as a shock absorber, and although I have particularly designed the device as I present it in the drawings hereinafter referred to as applicable particularly to trucks and other heavy vehicles, it can also be used with pleasure vehicles, and those of lighter structure and weight.

My invention is embodied in a device which is preferably located and positioned at one end of the ordinary spring member and in the drawing hereto annexed I have shown it in this way.

Referring to these drawings which form a part of this specification Fig. 1 represents a spring in front elevation with my invention applied at one end.

Fig. 2 is a vertical section of the device on the line II—II of Fig. 1; no burden as yet has been applied to the protector as here shown.

Fig. 3 is a detail view showing the position of the parts where the burden has been applied.

Fig. 4 is a detail horizontal section of the parts on the line IV—IV Fig. 1.

In these drawings 10 represents a spring of ordinary construction seated approximately midway of its length on the axle 11 and attached at one end 12 by any suitable means to the chassis.

At 13 I show the chassis. At 14 I show a rectangular steel frame attached to the chassis by means of an angle bar 15; an offset piece is employed at 16 to properly position the parts, bolts 17 securing the angle piece 15 to the chassis and bolts 18 securing the steel frame to the angle bar and chassis.

The end 19 of the spring assembly 10 is coiled around the pin 20 which pin is fixed in the upper part of the links 21. These links at their lower ends turn on pin 22 of the vertically moving pins 23. The vertical pins 23 have nuts 24 screwed on to said pins beneath the sliding member 25; this sliding member has prolongations 26 at the ends which serve to straddle the sides of the frame 14, the said frame 14 acting as a guide for the sliding member 25 as it moves up and down.

At 27 I show coil springs surrounding the vertical pins 23, which said springs seat at their lower terminals on the sliding member or platform 25, and at their upper ends bear against the cross piece 28 which latter is secured at 29 by the rivets 30 to the side members of the frame 14.

The pins 23 ordinarily extend through and beneath the lower bar 31 of the frame 14 at openings 32. The nuts 24 can be set and adjusted on the screw threaded portion 33 of the pins 23. In this manner the pins 23 which are centrally positioned in respect to the supplementary springs 27 can operate freely relatively to the frame 14 and the bottom connecting band 31.

In Fig. 2 the springs 27 are shown in their expanded position and in Fig. 3 the springs are shown in their contracted position, the frame 14 having been depressed by reason of the burden coming on the chassis to which the said vertical frame is attached and the operation being that said burden having been imposed and the frame 14 having moved down the vertical pins 23 which are hung on the links 21 will cause through the intermediary of the nuts 24 bearing against the lower surface of the platform 25 to draw the spring together the result being that the said spring 27 will receive the force of the initial impact of the burden, and through this spring the said stress will be carried to the end of the vehicle spring 10 through the intermediary of the links aforesaid being swiveled on to the ends of said vertical springs.

In the upper part of the frame structure is another pair of supplementary vertically positioned springs 34 and centrally positioned in these springs are pins 35 having heads 36 positioned below the platform 37, which latter has a relatively sliding movement in respect to the sides of the frame 14, and is provided with projecting ends 38 which straddle the said sides of the frame 14, see Fig. 4. The upper ends of the pins 35 extend through the upper cross piece 39 of the frame 14 and are furnished with nuts 40 which screw on to suitable screw threaded portions at the upper end of the said pins. These nuts are placed just above the cross pieces 39.

The platform 37 is provided with a supplementary and removable bearing surface 41 attached to the platform by bolts 42 and nuts 43. This bearing surface is removable and renewable.

As above stated the further end of the vehicle spring 10 is mounted on the pin 20 by means of the coiled member 19 of the said spring and I here place a removable and renewable bearing surface 44 which is complementary to the bearing surface 41, and these two surfaces 44 and 41 are adapted to ride upon each other when brought into contact, see Fig. 3. The member 44 is secured by means of a yoke 45 having pins 46, a cross bar 47 and nuts 48.

When these bearing surfaces wear in the manner hereinafter described they can be removed and replaced, in other words, renewed in the manner above explained.

It will be seen that when the frame 14 has been subjected to its preliminary movement and the springs 27 have been compressed, thus relieving the vehicle spring proper of the preliminary blow or shock, the frame 14 has of course moved down, and such frame moving down will compress the upper supplementary springs 34 which will in turn depress the platform 37 and bring the bearing surface 41 into contact with the surface 44, and by reason of this will tend to transfer the burden to the vehicle spring proper and permitting at the same time a sliding movement relative between the bearing surface 41 and the bearing surface 44.

It will be seen from the foregoing that I have designed a chassis and spring protector which will be effective preliminarily on a set of supplementary springs positioned below the end of the vehicle spring proper and that a further increment of burden will compress the second set of supplementary springs positioned above the end of the vehicle spring proper, and that these two sets of springs co-ordinating in the manner heretofore described and illustrated in the drawings, will successively and then jointly relieve the vehicle spring proper of the shocks of the burden when applied, and to this extent and in this manner my device constitutes a shock absorber.

Having thus described my invention the following is what I claim as new and useful therein and desire to secure by Letters Patent:

1. A shock absorber embodying a main spring supported centrally upon the axle and suitably swung at one end to the chassis, and a frame having vertically disposed supporting links providing a swinging movement for the main spring, supporting and bearing surfaces providing a sliding movement for the main spring, and vertically positioned springs providing a vertical cushioning means for said end of the main spring.

2. A shock absorber embodying a main spring supported centrally upon the axle and suitably swung at one end to the chassis, and at the other on the upper end of swinging links, vertically moving spring controlled pins to which the swinging links are swiveled, compression springs positioned above the end of the main spring, a platform to receive the blow of the main spring and a bearing surface around the top of the end of the main spring.

3. A shock absorber embodying a main spring supported centrally upon the axle and suitably swung at one end to the chassis, vertically disposed swinging links supporting at their upper and free ends the other terminal of the main spring, vertically disposed spring controlled pins to which the lower ends of the links are pivoted, means for retaining the pins in upright position, supplementary vertically positioned springs located above the swinging links and contiguous to the free ends thereof, and suitable bearing and sliding surfaces between the lower ends of the supplementary springs and the swinging links.

4. A shock absorber embodying a main spring supported centrally upon the axle and suitably swung at one end to the chassis, vertically disposed swinging links supporting at their upper and free ends the other terminal of the main spring, vertically disposed pins to which the lower ends of the links are pivoted, coiled springs positioned around the pins, a member capable of vertical sliding movement extending between and connecting the pins and on which the coiled springs seat, a suitable frame, a cross piece fixed thereto against which latter the coiled springs bear at their upper ends, and supplementary springs in the upper part of the frame and above the upper ends of the swinging links.

IRA B. BLISS.